US011980889B2

(12) United States Patent
Bernard et al.

(10) Patent No.: US 11,980,889 B2
(45) Date of Patent: May 14, 2024

(54) MICROFLUIDIC CHIP, HEAD, AND DISPENSING DEVICE FOR DISPENSING FLUIDS CONTAINING AN ACIDIC COMPONENT

(71) Applicant: FUNAI ELECTRIC CO., LTD., Osaka (JP)

(72) Inventors: David L. Bernard, Lexington, KY (US); Sean T. Weaver, Florence, KY (US)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 18/137,776

(22) Filed: Apr. 21, 2023

(65) Prior Publication Data

US 2023/0249190 A1 Aug. 10, 2023

Related U.S. Application Data

(62) Division of application No. 16/811,778, filed on Mar. 6, 2020, now Pat. No. 11,666,918.

(51) Int. Cl.

*G01N 33/48* (2006.01)
*B01L 3/00* (2006.01)
*B67D 3/00* (2006.01)

(52) U.S. Cl.

CPC ........... *B01L 3/52* (2013.01); *B01L 3/502707* (2013.01); *B01L 2200/12* (2013.01); *B01L 2200/16* (2013.01); *B01L 2300/06* (2013.01); *B01L 2300/0819* (2013.01); *B01L 2300/0858* (2013.01); *B01L 2300/12* (2013.01)

(58) Field of Classification Search

CPC .. B01L 3/52; B01L 3/502707; B01L 2200/12; B01L 2200/16; B01L 2300/06; B01L 2300/0819; B01L 2300/0858; B01L 2300/12

USPC .......................................................... 222/573

See application file for complete search history.

(56) References Cited

U.S. PATENT DOCUMENTS

| | | | |
|---|---|---|---|
| 6,555,480 | B2 | 4/2003 | Milligan et al. |
| 7,380,915 | B2 | 6/2008 | Terui |
| 7,938,975 | B2 | 5/2011 | Krawcyzk et al. |
| 9,552,984 | B2 | 1/2017 | Hiramoto et al. |
| 9,586,400 | B2 | 3/2017 | Kato et al. |
| 10,343,403 | B2 | 7/2019 | Teranishi et al. |
| 2003/0202049 | A1 | 10/2003 | Chen et al. |
| 2004/0174411 | A1 | 9/2004 | Sumiya et al. |
| 2006/0079095 | A1 | 4/2006 | McReynolds et al. |

(Continued)

FOREIGN PATENT DOCUMENTS

| | | | |
|---|---|---|---|
| CN | 1400100 | A | 3/2003 |
| WO | 2011053288 | A1 | 5/2011 |

*Primary Examiner* — Christine T Mui

(74) *Attorney, Agent, or Firm* — Dinsmore & Shohl LLP

(57) ABSTRACT

A method of generating a microfluidic ejection chip is provided. The method includes creating an opening in a silicon substrate through multiple iterations of a deep reactive ion etching process, forming a passivation layer over any exposed portion of silicon at the opening following each iteration of the deep reactive ion etching of the silicon substrate, and not removing the passivation layer at a conclusion of the etching of the silicon substrate to define a fluid passageway at the opening in the silicon substrate, such that the passivation layer is permanent on the silicon substrate at the opening.

6 Claims, 6 Drawing Sheets

(56) References Cited

U.S. PATENT DOCUMENTS

| | | | | |
|---|---|---|---|---|
| 2009/0091604 | A1* | 4/2009 | Bell | B41J 2/1628 29/890.1 |
| 2009/0095709 | A1 | 4/2009 | McAvoy et al. | |
| 2017/0341390 | A1 | 11/2017 | Kanri et al. | |
| 2018/0147848 | A1 | 5/2018 | Teranishi et al. | |

* cited by examiner

MICROFLUIDIC CHIP, HEAD, AND DISPENSING DEVICE FOR DISPENSING FLUIDS CONTAINING AN ACIDIC COMPONENT

CROSS-REFERENCE TO RELATED APPLICATIONS

This application is a divisional application of U.S. patent application Ser. No. 16/811,778, filed on Mar. 6, 2020, the entire contents of which are herein incorporated by reference.

BACKGROUND OF THE INVENTION

1. Field of the Invention

The present invention relates to fluidic dispensing devices, and, more particularly, to a fluidic dispensing device, such as a microfluidic dispensing device, for dispensing fluids containing an acidic component that is chemically reactive with silicon.

2. Description of the Related Art

One type of microfluidic dispensing device, as described in U.S. Pat. No. 7,938,975, for example, is a thermal ink jet printhead cartridge having a micro-fluid ejection head. Such a microfluidic dispensing device has a compact design, and typically includes an on-board fluid reservoir in fluid communication with the on-board microfluidic ejection chip. Within the microfluidic dispensing device there are fluidic manifolds, fluidic flow channel structures, and individually or collectively addressable and configurable individual jetting chambers capable of accurately and repeatably jetting droplets in the 5 to 100 picoliters range at reproducible drop velocities and drop mass. Structurally, the microfluidic ejection chip includes a silicon layer in the form of a silicon substrate, and a layer that mounts a nozzle plate having one or more fluid ejection nozzles, wherein the silicon substrate includes fluid channels to form a fluid interface between the fluid reservoir of the cartridge and the nozzle plate.

In the Life Sciences industry, there is a need for devices that can deliver accurately metered samples for analysis, calibration and characterization, such as for the delivery of spotting reagents for sample preparation for inductively coupled plasma mass spectrometry (ICP-MS) analytical instruments. It may appear that the prior art microfluidic dispensing device might be a good candidate for such Life Sciences applications, such as, for example, wherein the reagent might be stored in the printhead cartridge and used for in situ calibration standards. However, such reagents typically have an acidic content, e.g., one to three percent hydrofluoric acid/nitric acid ($HF/HNO_3$), and $HF/HNO_3$ is known to be an aggressive silicon etchant. Thus, such reagents are not compatible with the prior art microfluidic dispensing device because the silicon substrate would be exposed to the reagent, resulting in an $HF/HNO_3$ etching of the exposed silicon, and in turn, resulting in a silicon contamination of the samples under analysis.

What is needed in the art is a fluidic dispensing device configured for dispensing fluids containing an acid that is reactive with silicon.

SUMMARY OF THE INVENTION

The present invention provides a fluidic dispensing device, and more particularly, a microfluidic chip, head, and dispensing device for dispensing fluids containing an acidic component, such as for example $HF/HNO_3$, that is chemically reactive with silicon.

The invention, in one form, is directed to a microfluidic ejection chip that includes a silicon substrate having a fluid passageway. The fluid passageway is defined by a silicon sidewall of the silicon substrate that is covered by a permanent passivation layer to protect the silicon sidewall from exposure to an acidic fluid, i.e., a fluid having an acidic component. The permanent passivation layer is retained on the silicon sidewall at a conclusion of etching of the silicon substrate to form the fluid passageway.

The invention, in another form, is directed to a microfluidic ejection head. The microfluidic ejection head includes a microfluidic ejection chip connected to a nozzle plate. The microfluidic ejection chip includes a silicon substrate having a fluid passageway. The fluid passageway is defined by a silicon sidewall of the silicon substrate that is covered by a permanent passivation layer to protect the silicon sidewall from exposure to an acidic fluid.

The invention, in another form, is directed to a fluidic dispensing device. The fluidic dispensing device includes a fluid reservoir for carrying a fluid that contains an acidic component that is reactive with silicon, and a microfluidic ejection head having a microfluidic ejection chip connected to a nozzle plate. The microfluidic ejection chip includes a silicon substrate having a fluid passageway that is in fluid communication with each of the fluid reservoir and the nozzle plate. The fluid passageway is defined by a silicon sidewall of the silicon substrate that is covered by a permanent passivation layer.

The invention, in still another form, is directed to a method of generating a microfluidic ejection chip, including creating an opening in a silicon substrate through multiple iterations of a deep reactive ion etching process; forming a passivation layer over any exposed portion of silicon at the opening following each iteration of the deep reactive ion etching of the silicon substrate, and not removing the passivation layer at a conclusion of the etching of the silicon substrate to define a fluid passageway at the opening in the silicon substrate, such that the passivation layer is permanent on the silicon substrate at the opening.

One advantage of the present invention is that the permanent passivation layer is not chemically reactive with the acidic fluid (e.g., a reagent having one to three percent $HF/HNO_3$), and thus, the permanent passivation layer protects the silicon sidewall of the silicon substrate at the fluid passageway from being chemically etched by the acidic fluid that is desired to be ejected from the microfluidic chip, head, and dispensing device.

Another advantage of the present invention is that the device and method of the present invention can maximize the thickness of the permanent passivation layer (e.g., the fluorocarbon layer) by manipulating parameters in the deep reactive ion etching (DRIE) process.

Another advantage of the present invention is that the method eliminates the typical cleaning steps that following the etching and passivation layer formation, thus leaving the permanent passivation layer over the silicon sidewall around the entire perimeter of the fluid passageway.

Still another advantage of the present invention is that the permanent passivation layer is formed as a by-product of a DRIE fluorocarbon deposition, which serves as a functional barrier layer to protect the silicon substrate from undesired chemical etching by the acidic fluid that is to be ejected from the microfluidic ejection head.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION OF THE INVENTION

Figure 1:
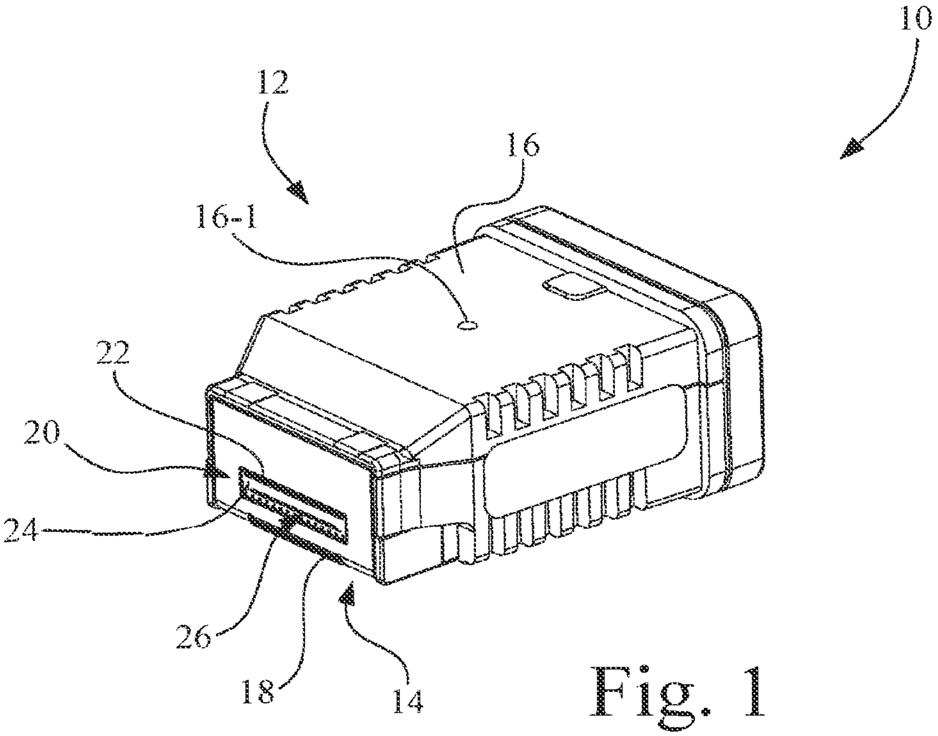
FIG. 1 is a perspective view of a microfluidic dispensing device that includes a microfluidic ejection head having a microfluidic ejection chip configured in accordance with an embodiment of the present invention.

Referring now to the drawings, and more particularly to FIG. 1, there is shown a fluidic dispensing device in accordance with an embodiment of the present invention, which in the present example is a microfluidic dispensing device 10. In particular, microfluidic dispensing device 10 is adapted to dispense a fluid that contains an acidic component that is reactive with silicon.

As shown in FIG. 1, microfluidic dispensing device 10 generally includes a housing 12 and a tape automated bonding (TAB) circuit 14. Housing 12 includes a fluid reservoir 16 that contains the supply of the fluid having the acidic component (i.e., having a silicon etchant) that is reactive with silicon, which for convenience hereinafter will be referred to as "the acidic fluid", and which is desired to be ejected from microfluidic dispensing device 10. In the present example, the acidic fluid is a reagent having one to three percent hydrofluoric acid/nitric acid ($HF/HNO_3$) by volume of the fluid, wherein $HF/HNO_3$ is the silicon etchant Other non-limiting examples of such an acidic component (i.e., a silicon etchant) of the acidic fluid are: Ethylenediamine pyrocatechol (EDP), Potassium hydroxide/Isopropyl alcohol (KOH/IPA), and Tetramethylammonium hydroxide (TMAH) In the present embodiment, for example, the acidic fluid may reside in a capillary member, such as a foam material, within fluid reservoir 16. Fluid reservoir 16 may be vented to atmosphere via a vent port 16-1. TAB circuit 14 is configured to facilitate the ejection of the acidic fluid from housing 12.

TAB circuit 14 includes a flex circuit 18 to which a microfluidic ejection head 20 is mechanically and electrically connected. Flex circuit 18 provides electrical connection to a separate electrical driver device (not shown) that is configured to send electrical signals to operate microfluidic ejection head 20 to eject the acidic fluid that is contained within fluid reservoir 16 of housing 12.

Figure 2:
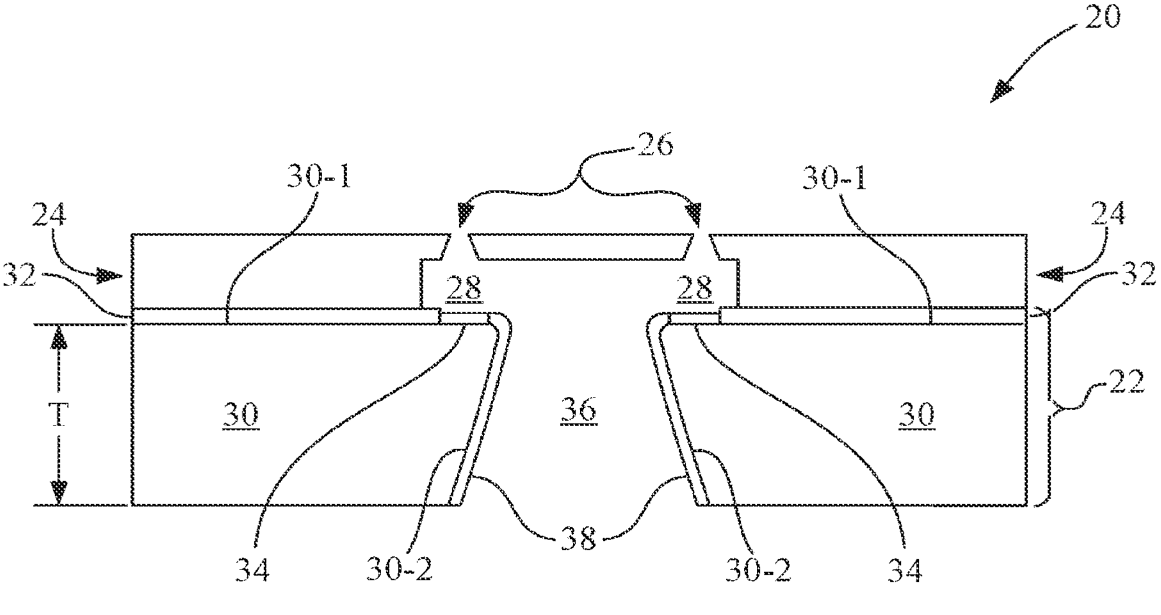
FIG. 2 is a pictorial cross-sectional representation, not to scale, of the microfluidic ejection head of the microfluidic dispensing device of FIG. 1, showing a permanent passivation layer formed in a fluid passageway of the microfluidic ejection chip.

Referring also to FIG. 2, microfluidic ejection head 20 includes microfluidic ejection chip 22 to which a nozzle plate 24 is attached. Nozzle plate 24 includes a plurality of nozzle holes 26, and may include a plurality of fluid chambers 28 that are associated with the plurality of nozzle holes.

As shown in FIG. 2, microfluidic ejection chip 22 includes a silicon substrate 30 and an operational layer 32, wherein operational layer 32 is considered to be attached to a device surface 30-1 of silicon substrate 30. In practice, operational layer 32 is formed over silicon substrate 30 in multiple process steps during construction of microfluidic ejection chip 22. For example, operational layer 32 may include a plurality of fluid ejection elements 34 respectively associated with the plurality of fluid chambers 28 of nozzle plate 24. Each of fluid ejection elements 34 may be, for example, an electrical heater (thermal) element or a piezoelectric (electromechanical) device.

Operational layer 32 may also include various conductive, insulative, and protective materials that may be deposited, e.g., in layers, on device surface 30-1 of silicon substrate 30. Operational layer 32 may be configured to provide an electrical connection of fluid ejection elements 34 to flex circuit 18, which in turn facilitates electrical connection to the electrical driver device (not shown) for selectively electrically driving one or more of the plurality of fluid ejection elements 34 to effect fluid ejection from microfluidic ejection head 20.

Silicon substrate 30 of microfluidic ejection chip 22 includes a fluid passageway 36 that is formed through a thickness T of silicon substrate 30. Fluid passageway 36 is configured to provide a fluid interface between the plurality of fluid chambers 28 and fluid reservoir 16. Thus, in the present embodiment, fluid passageway 36 provides a fluid supply path to supply a flow of the acidic fluid from fluid reservoir 16 (see FIG. 1) to the plurality of fluid chambers 28 associated with the plurality of fluid ejection elements 34, and in turn, to nozzle plate 24. Accordingly, fluid passageway 36 is in fluid communication with each of fluid reservoir 16 and nozzle plate 24.

Fluid passageway 36 may be, for example, an opening, e.g., an elongate slot, formed in silicon substrate 30 that is defined by a silicon sidewall 30-2 that is covered by a permanent passivation layer 38, i.e. a permanent protective layer, in fluid passageway 36 that was formed during creation of fluid passageway 36 in (e.g., through) silicon substrate 30. For example, following each stage of silicon etching, a deposition step of bombarding the exposed silicon with $C_4F_8$ gas may be used to generate permanent passivation layer 38 as a fluorocarbon layer over the exposed silicon.

Advantageously, permanent passivation layer 38 is not chemically reactive with the acidic fluid (e.g., a reagent having one to three percent $HF/HNO_3$), and thus, permanent passivation layer 38 protects silicon sidewall 30-2 of silicon substrate 30 from being chemically etched by the acidic fluid that is desired to be ejected from microfluidic dispensing device 10.

Figure 3:
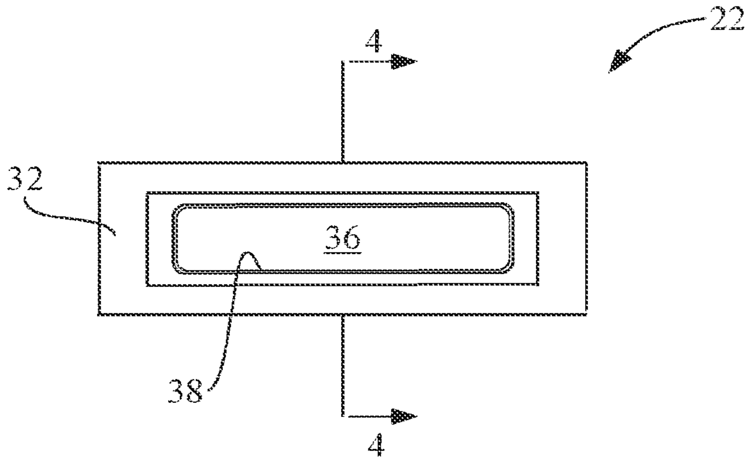
FIG. 3 is an enlarged top view of the microfluidic ejection chip of the microfluidic dispensing device of FIG. 1, with the nozzle plate removed to expose a fluid passageway that is covered with a permanent passivation layer formed during the deep reactive ion etching process (DRIE) used in forming the fluid passageway in the silicon substrate.
Figure 4:
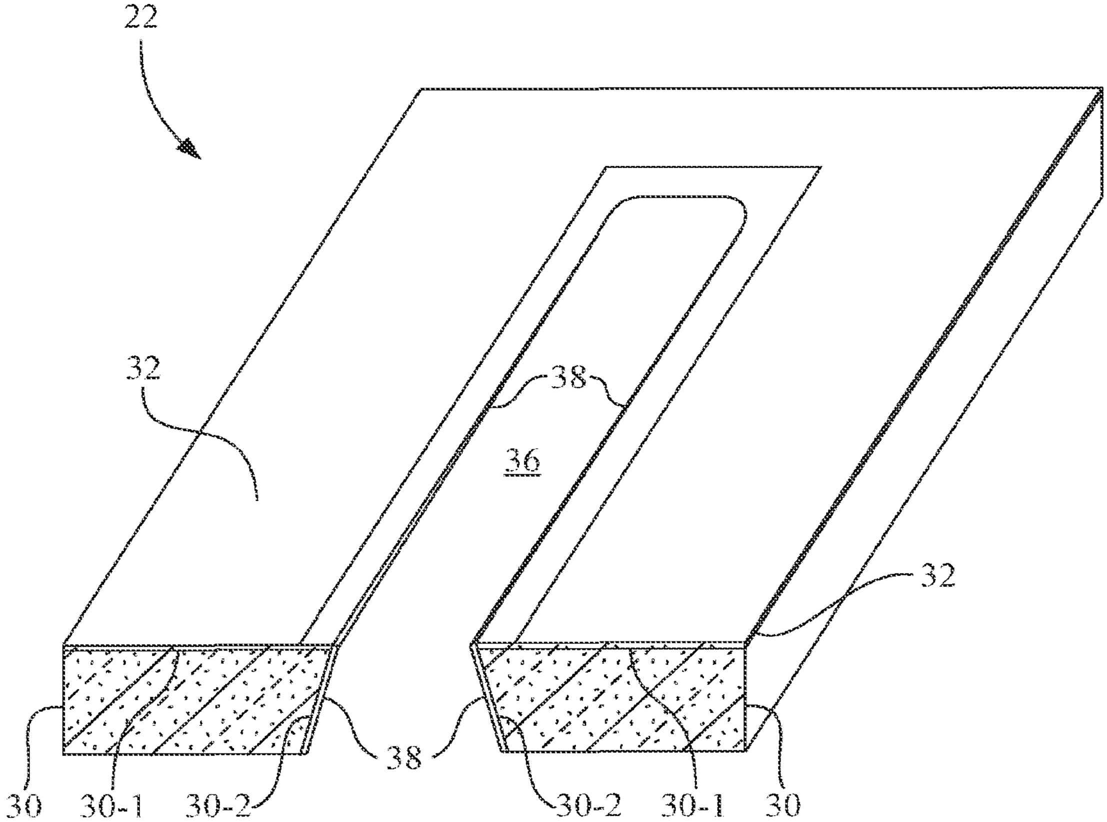
FIG. 4 is a section view (further enlarged) of the microfluidic ejection chip taken along line 4-4 of FIG. 3, depicting a portion of the perimeter sidewall of the fluid passageway, wherein the sidewall is covered with the permanent passivation layer.

Referring also to FIGS. 3 and 4, each of silicon sidewall 30-2 and permanent passivation layer 38 extends continuously around a perimeter of fluid passageway 36 at silicon substrate 30. More particularly, permanent passivation layer 38 extends continuously around the perimeter of fluid passageway 36 at silicon sidewall 30-2, so as to cover an entirety of silicon sidewall 30-2 and protect silicon sidewall 30-2 from exposure to the acidic fluid.

Fluid passageway 36, including permanent passivation layer 38, is formed in silicon substrate 30 during the deep reactive ion etching (DRIE) process used to create the hole, e.g., elongate slot, of fluid passageway 36 in silicon substrate 30. In forming fluid passageway 36 using the DRIE process, silicon sidewall 30-2 and permanent passivation layer 38 of fluid passageway 36 may be tapered, wherein fluid passageway 36 narrows in a direction toward nozzle plate 24. In accordance with an aspect of the present invention, permanent passivation layer 38 is retained on silicon sidewall 30-2 at the conclusion of the etching of silicon substrate 30 to form fluid passageway 36. In other words, permanent passivation layer 38 is formed over any exposed portion of silicon sidewall 30-2 following each iteration of the deep reactive ion etching of silicon substrate 30 to form fluid passageway 36.

Figure 5:
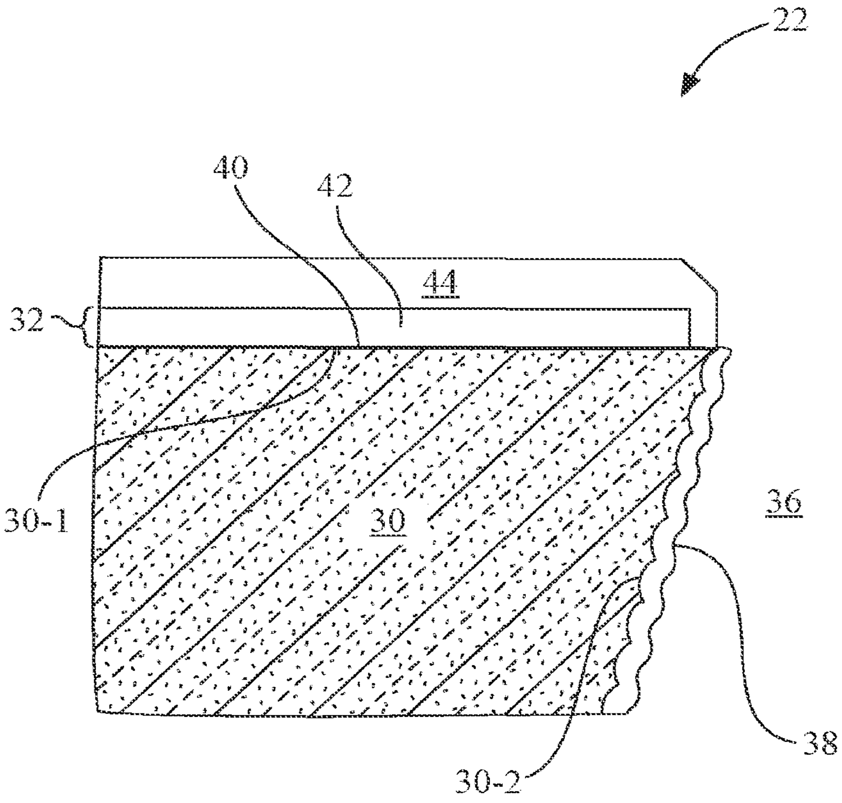
FIG. 5 is a further enlargement of a portion of the section view of FIG. 4, showing the silicon substrate having the permanent passivation layer formed on the sidewall of the fluid passageway.
Figure 6:
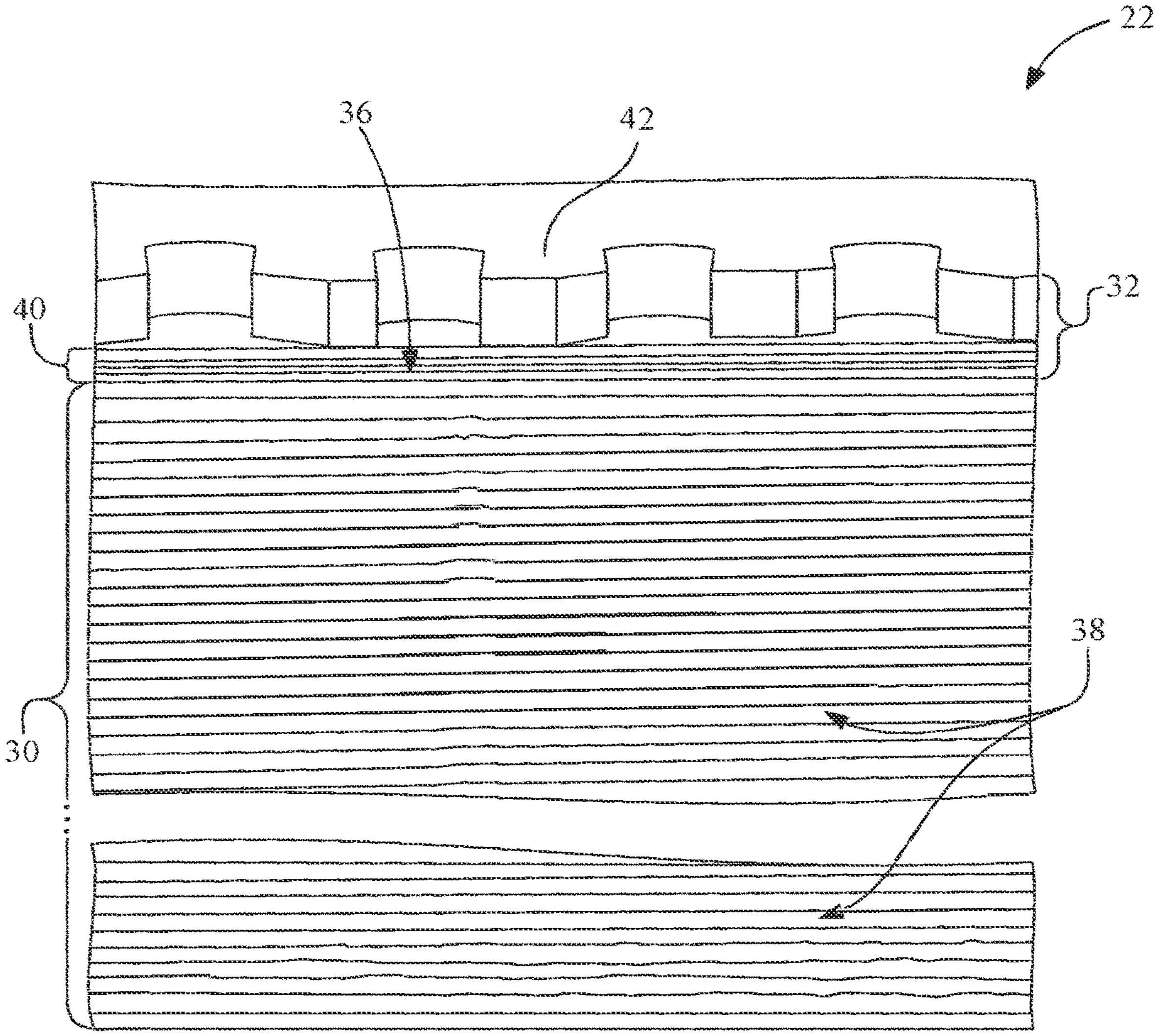
FIG. 6 is a side perspective view of a still further enlargement of the upper and lower portions of the fluid passageway of FIGS. 3-5, showing an operational layer having a flow feature layer and a device layer, and showing the permanent passivation layer formed over the sidewall of the silicon substrate at the fluid passageway.

Referring also to FIG. 5, there is shown a further enlargement of a portion of the section view of FIG. 4, depicting silicon sidewall 30-2 covered by permanent passivation layer 38. FIG. 6 shows a side perspective view of a still further enlargement of upper and lower portions of fluid passageway 36, showing permanent passivation layer 38.

FIGS. 5 and 6 further show more detail of operational layer 32, wherein operational layer 32 may include a device layer 40 and a flow feature layer 42. Device layer 40, e.g., a layer having conductive and insulative features, and the plurality of fluid ejection elements 34, may be formed over device surface 30-1 of silicon substrate 30, and protective layers of device layer 40 may be formed from a radiation curable resin composition that may be spin-coated onto the device surface 30-1 of silicon substrate 30. Then, flow feature layer 42 may be formed over device layer 40. As shown in FIG. 5, a positive resist DRIE layer 44 may be applied over flow feature layer 42 during formation of flow feature layer 42.

Figure 7:
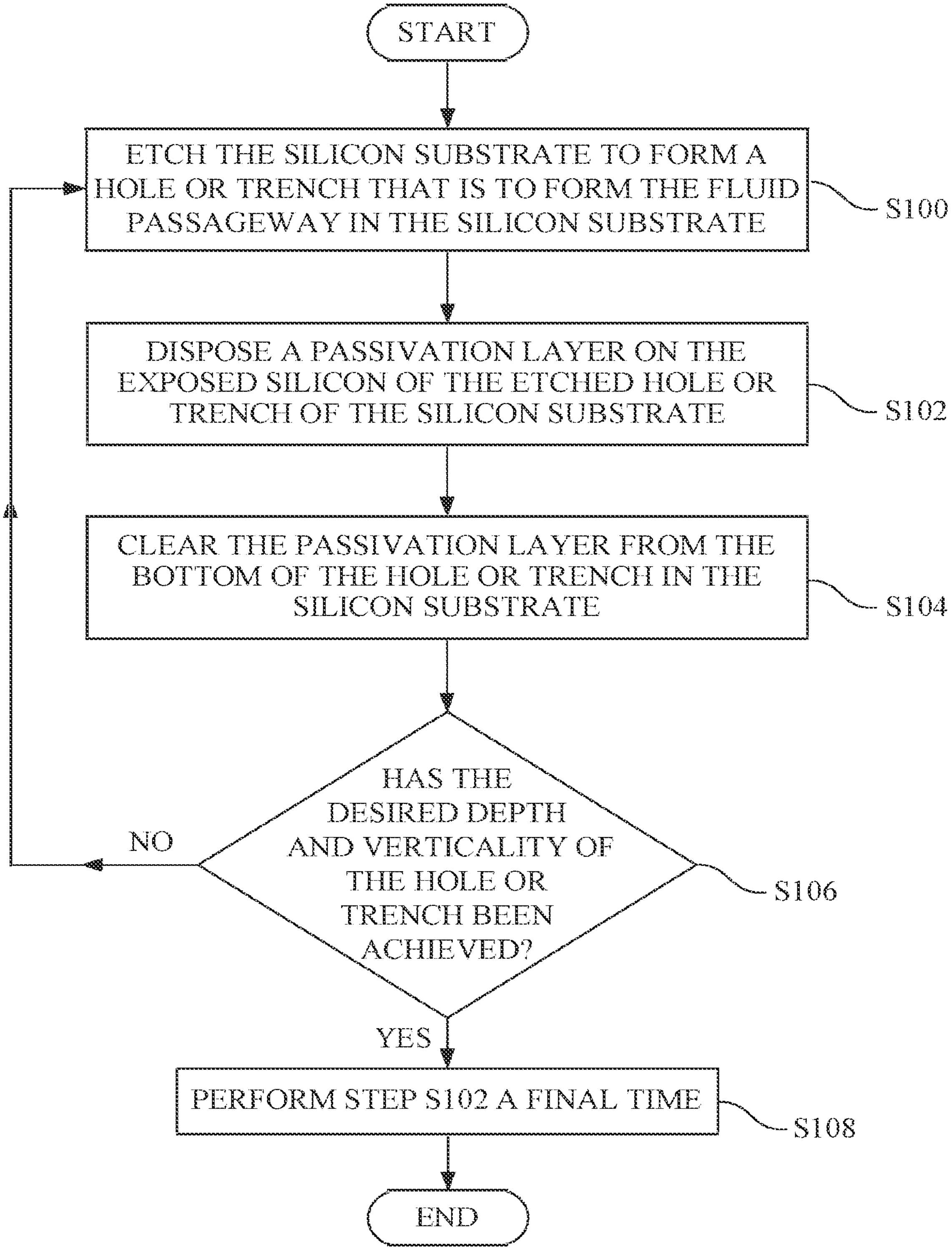
FIG. 7 is a flowchart of a method for creating the fluid passageway in the silicon substrate to have the permanent passivation layer, as in the microfluidic ejection chip of FIGS. 1-6.

Referring to FIG. 7, there is described a method for creating fluid passageway 36 (also sometimes referred to as an ink via/manifold) in silicon substrate 30 of microfluidic ejection chip 22 to include permanent passivation layer 38. Fluid passageway 36 is created in silicon substrate 30 of microfluidic ejection chip 22 through an adaptation of a DRIE process known as the Bosch process, which is a high-aspect ratio inductively-coupled plasma (ICP) etching process consisting of alternating successive steps.

The method of the invention is described below with reference to the flowchart of FIG. 7, in conjunction with the drawings of FIGS. 1-6.

At step S100, silicon substrate 30 is etched by an isotropic sulfur hexafluoride ($SF_6$) plasma (ICP) etching of silicon substrate 30, which attacks the exposed silicon of silicon substrate 30 in an essentially vertical direction, to form a hole or trench that will ultimately result in the formation of fluid passageway 36 in silicon substrate 30.

At step S102, permanent passivation layer 38 (i.e., a fluorocarbon-based protection layer) is disposed on the exposed silicon of silicon substrate 30 of the etched hole or trench that is forming fluid passageway 36, so as to prevent further lateral etching of silicon substrate 30 and to promote depth of the etch. This deposition step may be performed, for example, using a $C_4F_8$ gas flow. The thickness of permanent passivation layer 38 may be adjusted, for example, by modification of the deposition step pressure and $C_4F_8$ gas flow, wherein the ideal time, pressure, and gas flow volume to achieve the desired thickness may be determined by empirical testing. Thus, the thickness of the permanent passivation layer 38, e.g., a fluorocarbon layer, may be "tuned" to protect the sidewall of fluid passageway 36 being formed in silicon substrate 30, while not being so thick as to impact DRIE process times and throughput and promote selective post-etch removal at the bottom of the hole or trench.

At step S104, the bottom of the newly created hole or trench forming fluid passageway 36 in silicon substrate 30 is cleared of the fluorocarbon-based protection layer by a high bias mechanical sputtering and clearing of the bottom of the newly created hole or trench that will result in fluid passageway 36, so as to expose the silicon at the bottom of the hole or trench only to the subsequent repetition of step S100, i.e., the isotropic $SF_6$ ICP etch.

At step S106, it is determined whether the required depth and verticality of the hole or trench forming fluid passageway 36 in silicon substrate 30 is achieved. If the answer of the decision is NO, then steps S100 to S106 are repeated by returning to step S100. If the answer of the decision is YES, then the process of forming the hole or trench of fluid passageway 36 in silicon substrate 30 is complete, and the process proceeds to step S108.

At step S108, step S102 is performed a final time, and then the process ends with the completion of the formation of permanent passivation layer 38 over silicon sidewall 30-2 around the entire perimeter of fluid passageway 36.

In summary, in the example above, the method of the present invention is directed to a method of generating a microfluidic ejection chip 22, including the steps of creating an opening in a silicon substrate 30 through multiple iterations of a deep reactive ion etching process; forming a passivation layer 38 over any exposed portion of silicon at the opening following each iteration of the deep reactive ion etching of silicon substrate 30, and not removing passivation layer 38 at a conclusion of the etching of silicon substrate 30 to define a fluid passageway 36 at the opening in silicon substrate 30, such that passivation layer 38 is permanent on silicon substrate 30 at the opening. Fluid passageway 36 is defined by a silicon sidewall 30-2 of silicon substrate 30 that is entirely covered by passivation layer 38 to protect silicon sidewall 30-2 from exposure to an acidic fluid. The acidic fluid may be, for example, a reagent having a content of hydrofluoric acid/nitric acid ($HF/HNO_3$). Passivation layer 38 may be a fluorocarbon layer, wherein passivation layer 38 may be formed at the opening over any exposed portion of silicon using disposition of $C_4F_8$ gas. Passivation layer 38 extends continuously around a perimeter of fluid passageway 36.

Advantageously, the device and method of the present invention (1) maximizes the thickness of permanent passivation layer 38 (e.g., the fluorocarbon layer) by manipulating parameters in the DRIE etch, and (2) eliminates the typical cleaning steps following the etching and passivation layer formation, thus leaving permanent passivation layer 38 over silicon sidewall 30-2 around the entire perimeter of fluid passageway 36. Permanent passivation layer 38 prevents silicon sidewall 30-2 of silicon substrate 30 from the acid etchants of the acidic fluid that is to be elected from microfluidic ejection head 20.

Also, advantageously, in accordance with an aspect of the present invention, permanent passivation layer 38 is formed by a DRIE fluorocarbon deposition by-product to serve as a functional barrier layer to protect silicon substrate 30 from undesired chemical etching of the acidic fluid to be ejected from microfluidic ejection head 20.

Figure 8:
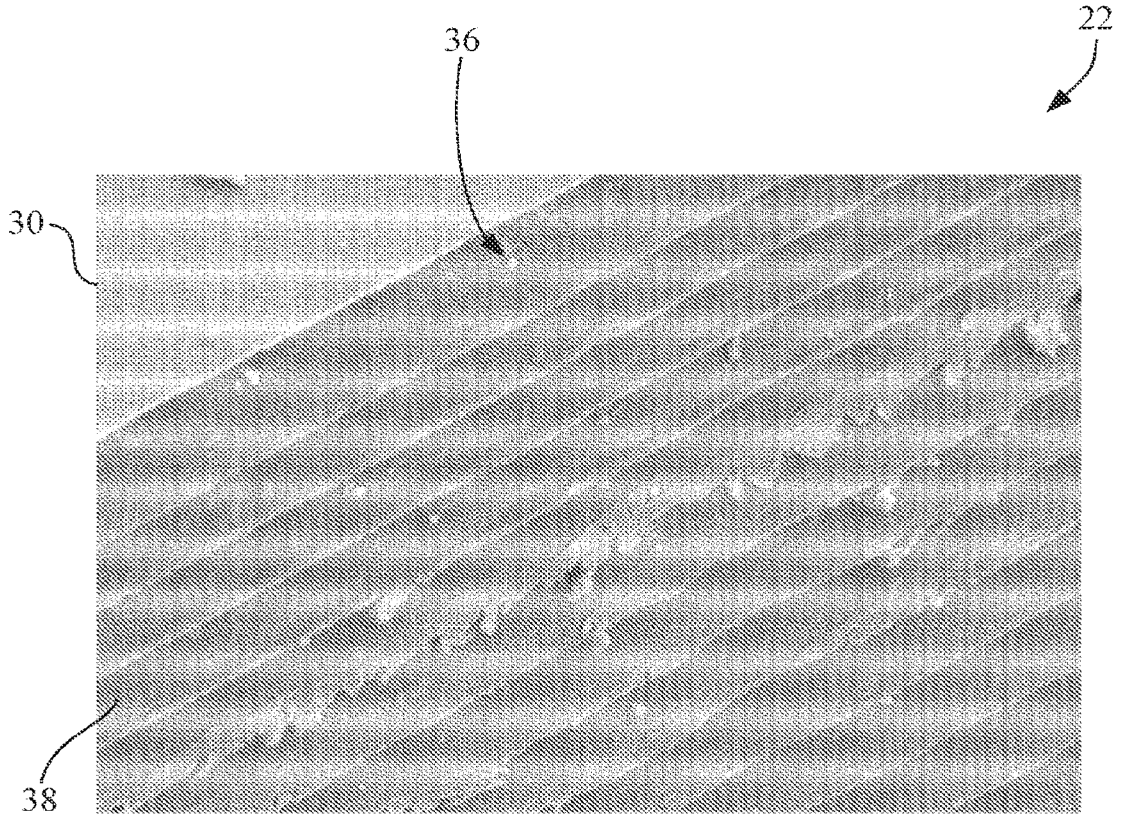
FIG. 8 is a close-up photograph of a magnified portion of the upper portion of the silicon substrate of FIG. 6, showing the permanent passivation layer formed over the sidewall of the silicon substrate at the fluid passageway.

FIG. 8 is a close-up photograph of a magnified portion of the upper portion of silicon substrate 30 (see, e.g., FIGS. 5 and 6) of microfluidic ejection chip 22, showing permanent passivation layer 38 formed over the sidewall of silicon substrate 30 at fluid passageway 36.

As a supplemental step, it is contemplated that a secondary hard mask on the back of the etched product wafer (silicon substrate) may be employed, wherein a follow-up deposition process could thicken the remaining sidewall passivation while protecting the backside of silicon substrate 30 of microfluidic ejection chip 22 from fluorocarbon contamination. This could be done with a patterned silicon wafer temporarily adhered through various commercially available techniques such as a bonding wax (QuickStick™ 135 Temporary Mounting Wax, Crystalbond™ Adhesives 509/555/590) whose thermal properties would not affect the temperature of silicon substrate 30 and would promote uniform deposition thicknesses on silicon substrate 30.

Referring again to FIG. 2 in conjunction with FIG. 6, at final assembly of microfluidic ejection head 20, nozzle plate 24 is positioned over flow feature layer 42 of operational layer 32 and attached to microfluidic ejection chip 22 to form microfluidic ejection head 20, wherein permanent passivation layer 38 remains affixed to silicon sidewall 30-2 of silicon substrate 30.

While the invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of generating a microfluidic ejection chip, comprising:

creating an opening in a silicon substrate through multiple iterations of a deep reactive ion etching process;

forming a passivation layer over any exposed portion of silicon at the opening following each iteration of the deep reactive ion etching of the silicon substrate;

not removing the passivation layer at a conclusion of the etching of the silicon substrate to define a fluid passageway at the opening in the silicon substrate, such that the passivation layer is permanent on the silicon substrate at the opening;

depositing an operational layer including fluid ejection elements on the silicon substrate, a device surface having conductive and insulative features, and a flow feature layer; and applying a resist layer over the flow feature layer.

2. The method of claim 1, wherein the fluid passageway is defined by a silicon sidewall of the silicon substrate that is entirely covered by the passivation layer to protect the silicon sidewall from exposure to an acidic fluid.

3. The method of claim 2, wherein the acidic fluid is a reagent having a content of hydrofluoric acid/nitric acid ($HF/HNO_3$), Ethylenediamine pyrocatechol (EDP), Potassium hydroxide/Isopropyl alcohol (KOH/IPA), or Tetramethylammonium hydroxide (TMAH).

4. The method of claim 1, wherein the passivation layer is a fluorocarbon layer.

5. The method of claim 1, wherein the passivation layer is formed at the opening over any exposed portion of silicon using disposition of $C_4F_8$ gas.

6. The method of claim 1, wherein the passivation layer extends continuously around a perimeter of the fluid passageway.

* * * * *